MIN DE LIN McGERRY.
CAR HEATING AND VENTILATING SYSTEM.
APPLICATION FILED MAY 10, 1909.
986,732.
Patented Mar. 14, 1911.
5 SHEETS—SHEET 1.
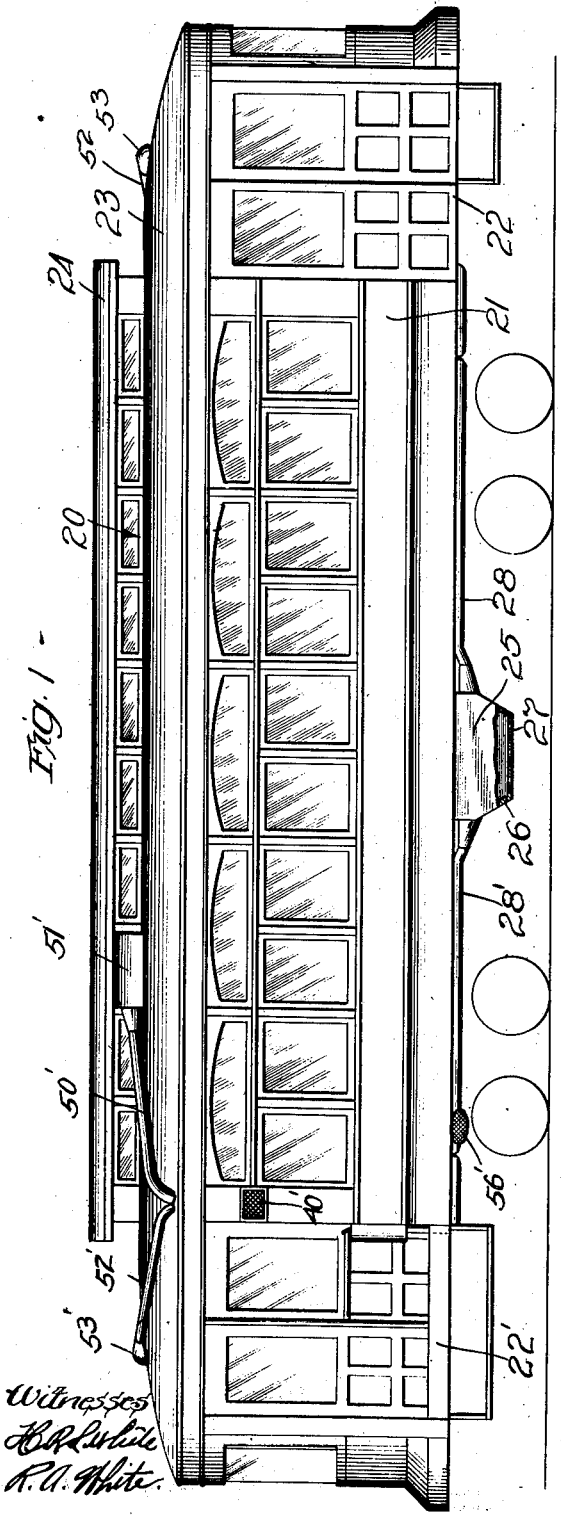
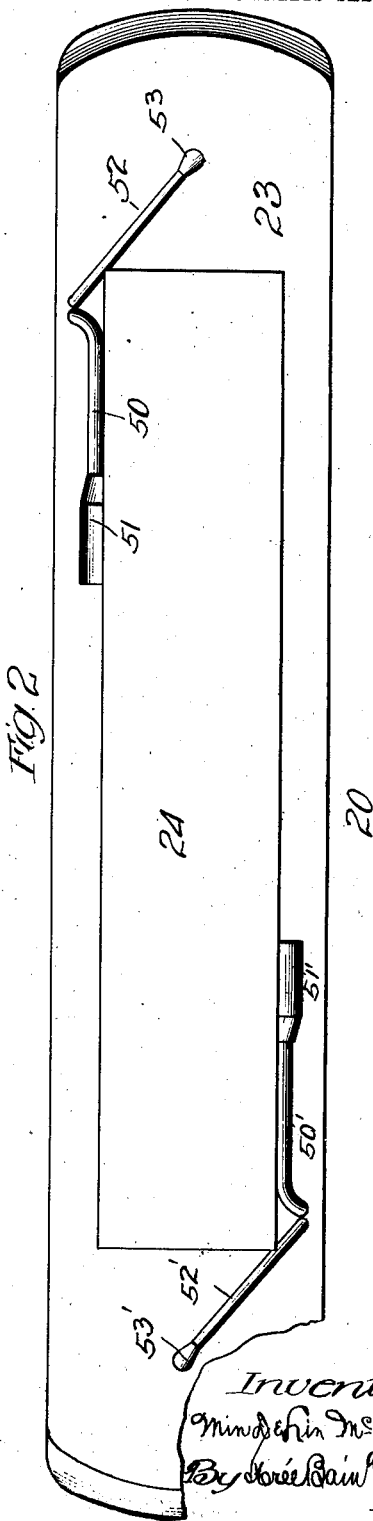

MIN DE LIN McGERRY.
CAR HEATING AND VENTILATING SYSTEM.
APPLICATION FILED MAY 10, 1909.
986,732.
Patented Mar. 14, 1911.
5 SHEETS—SHEET 2.
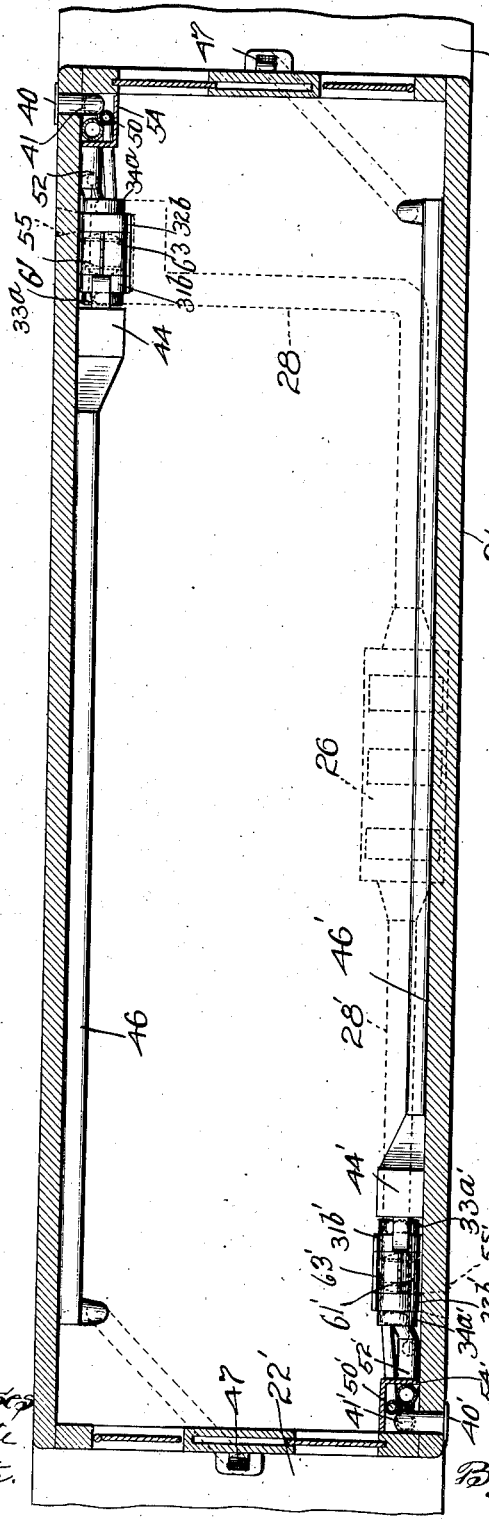
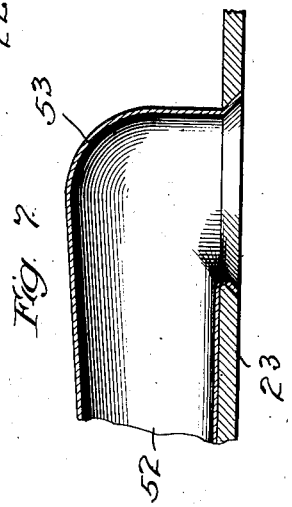
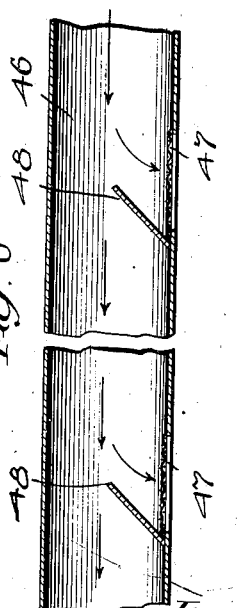

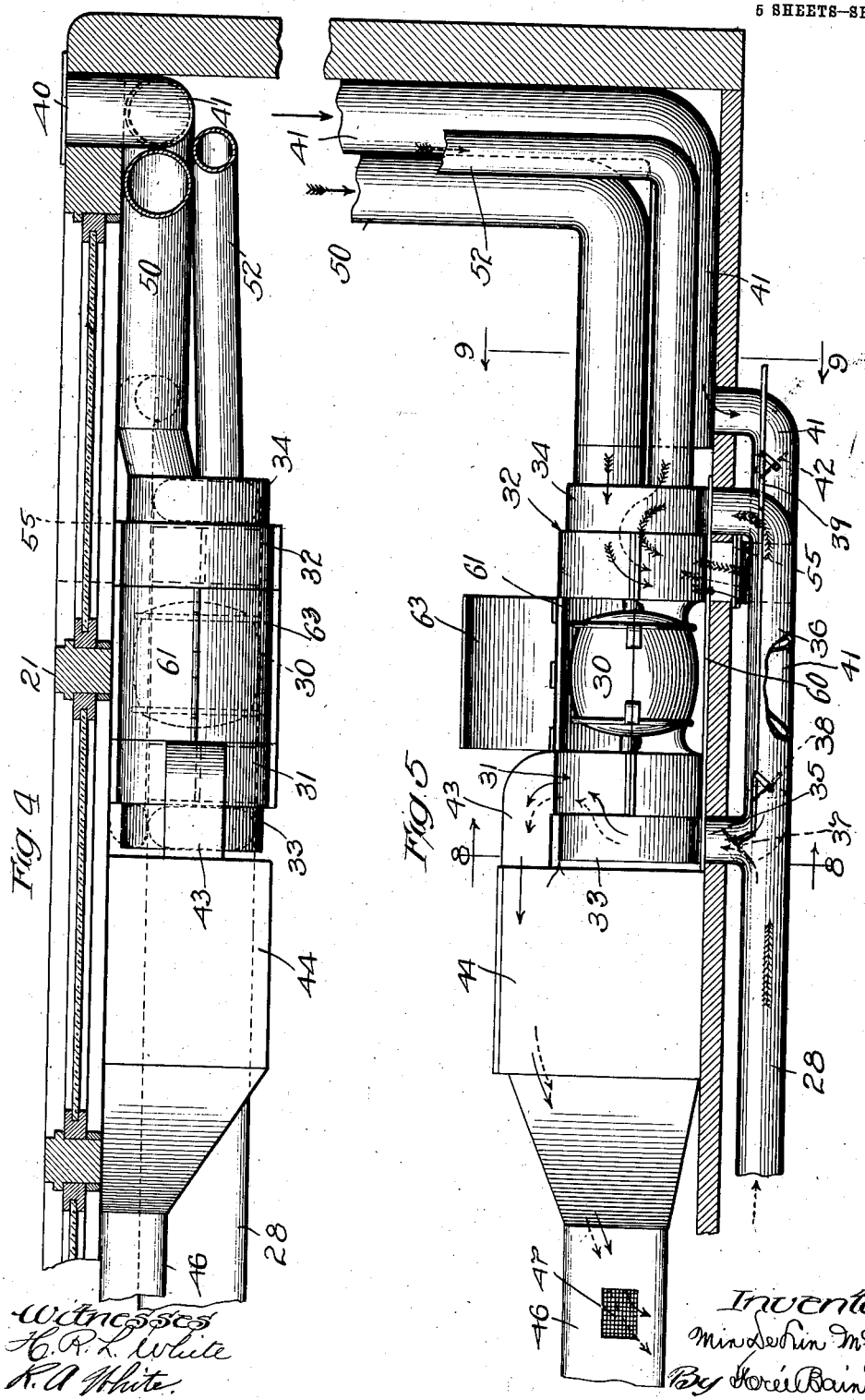

MIN DE LIN McGERRY.
CAR HEATING AND VENTILATING SYSTEM.
APPLICATION FILED MAY 10, 1909.
986,732.
Patented Mar. 14, 1911.
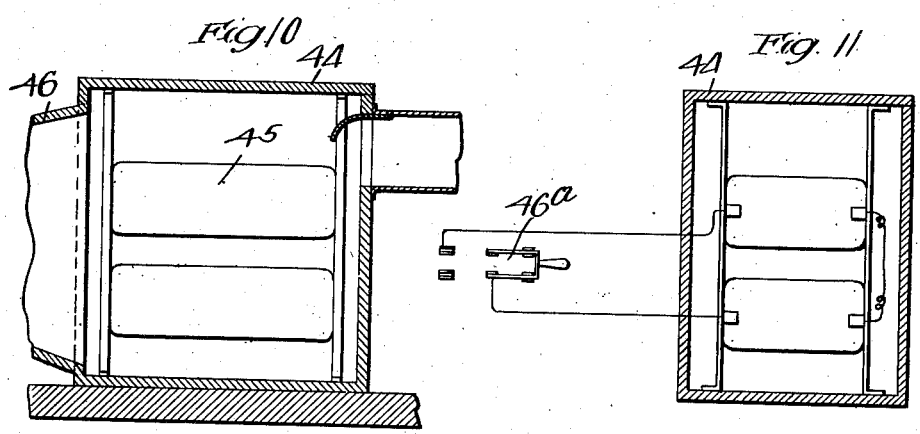
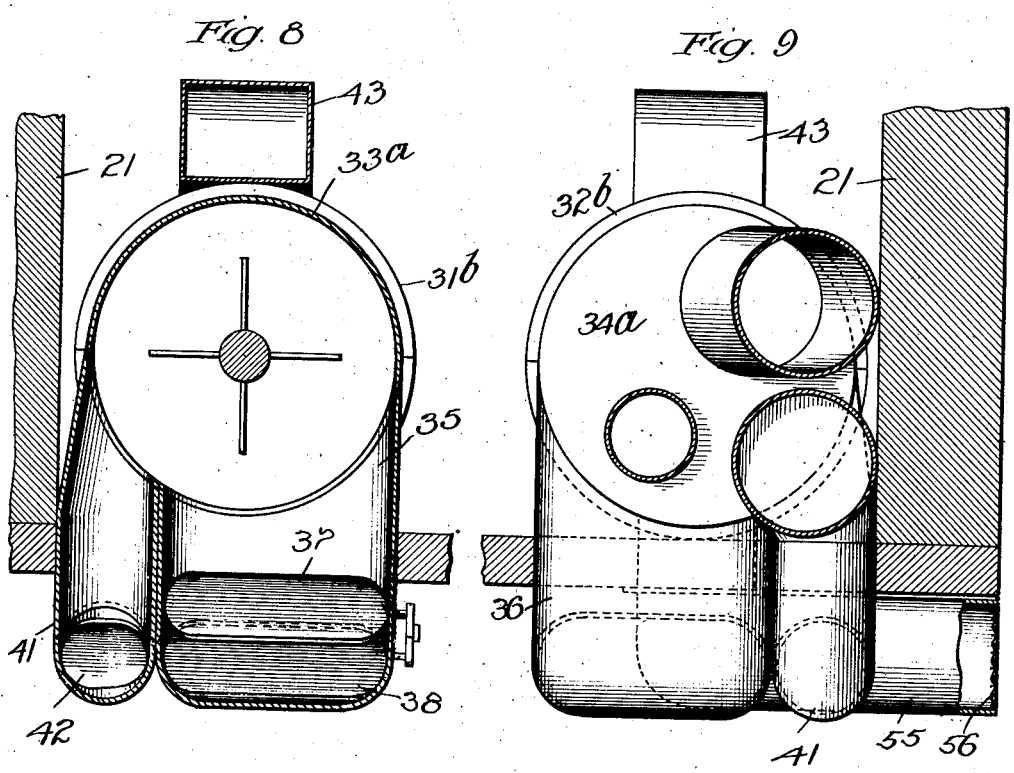

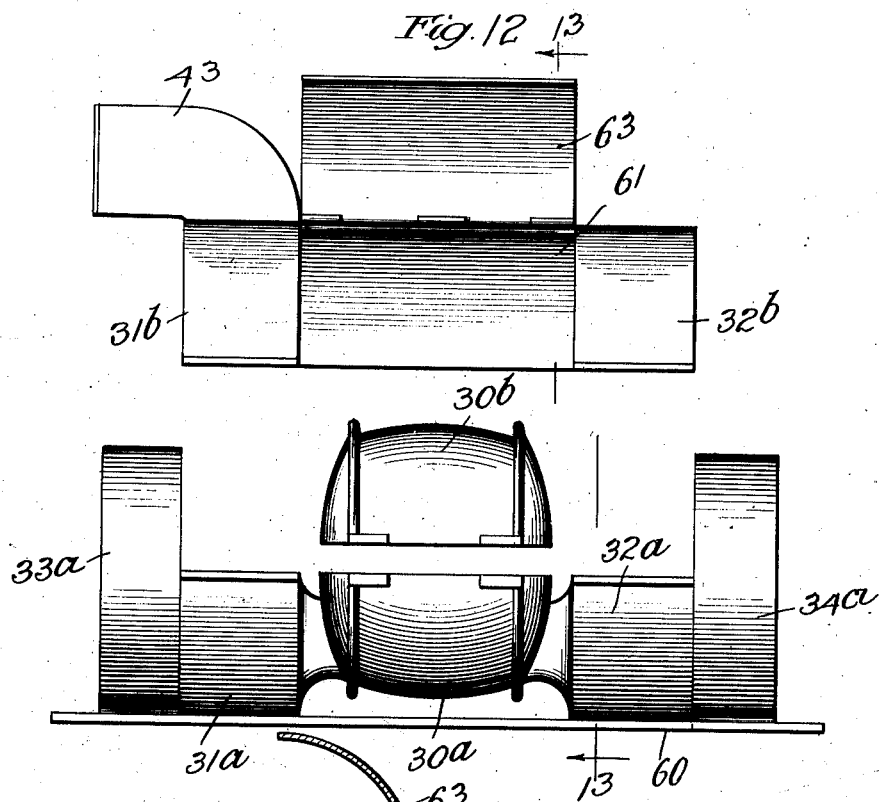
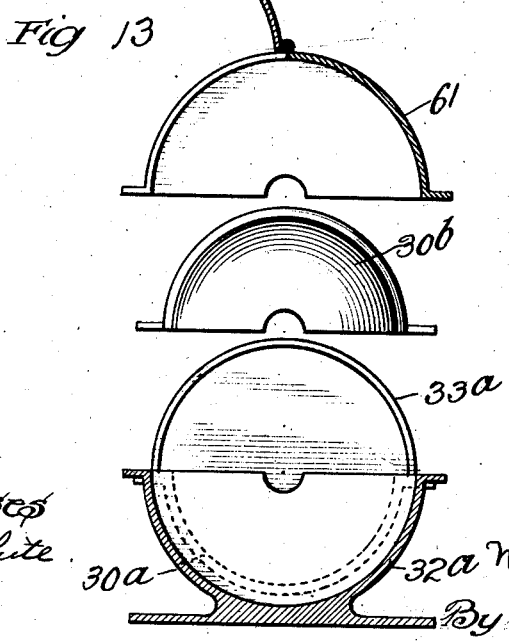

UNITED STATES PATENT OFFICE.

MIN DE LIN McGERRY, OF CHICAGO, ILLINOIS, ASSIGNOR, BY MESNE ASSIGNMENTS, TO FRANK P. MIES, OF CHICAGO, ILLINOIS.

CAR HEATING AND VENTILATING SYSTEM.

986,732.  Specification of Letters Patent.  Patented Mar. 14, 1911.

Application filed May 10, 1909. Serial No. 495,126.

*To all whom it may concern:*

Be it known that I, MIN DE LIN MC-GERRY, a citizen of the United States, residing at Chicago, in the county of Cook and State of Illinois, have invented certain new and useful Improvements in Car Heating and Ventilating Systems, of which the following is a specification.

My invention relates to improvements in car heating and ventilating systems, and has among its salient general objects to provide a system for positively introducing fresh air into and extracting foul air from the interior of the car, arranged to permit the introduction of fresh air at a natural temperature or in heated condition at pleasure; and economically to heat the air when heating is desired.

Among the more detailed objects of my invention are to provide a heating system especially adaptable for electric street cars in which the heat (heretofore wasted) of an electrical resistance necessary to the operation of the car and always provided on the car in commercial practice, may be utilized in attemperating the air either as a sole heating means or in conjunction with auxiliary heating means; to provide for uniform and thorough ventilation of all parts of the car, without the creation of violent drafts; to provide a system which is cheap, easily installed, convenient of access as to its parts which may need attention and repair, and susceptible of incorporation in street cars such as are now commonly used, in manner using the least possible amount of otherwise-available space.

Other and further objects of my invention will become apparent to those skilled in the art from the following description taken in conjunction with the accompanying drawings; wherein—

Figure 1 is a side elevation of a car equipped with a system in accordance with my invention; Fig. 2 is a plan view thereof; Fig. 3 is a section through the car above its floor showing the location of parts of the system; Fig. 4 is an enlarged view of some of the elements shown in Fig. 3; Fig. 5 is a vertical elevation of parts shown in Fig. 4; Figs. 6 and 7 are enlarged details of air distributing pipes; Figs. 8 and 9 are vertical sections on line 8—8 of Fig. 5 and line 9—9 of Fig. 5 respectively; Figs. 10 and 11 are respectively a longitudinally vertical section and a transverse vertical section through an auxiliary heating device; Fig. 12 is a side elevation of the motor casing part in separated relation; and Fig. 13 is a section on line 13—13 of Fig. 12.

In the embodiment of my invention illustrated, I contemplate the provision, in conjunction with an electric car, divided generally into three compartments, namely, the two platform compartments and the body, and having mounted below its floor a rheostat for controlling the operation of the electric motor device which, in normal operation, is constantly radiating heat, of a heating and ventilating system providing suitable ducts or conduits and power-driven air-propelling mechanism, arranged to permit the expulsion from the car of foul air and the introduction into the car of fresh air.

Further, my invention contemplates for the positive circulation of air through a path including a casing for the rheostat on the car, so that the air heated by contact with the rheostat may be introduced into the car in a tempered or warmed condition; and also preferably such an arrangement that, when desired, the air mechanically impelled through the rheostat casing may be delivered outside of the car and the fresh air impelled into the car body may be derived "cold" or at natural temperature from an inlet located at some other exterior point on the car, so that while the car rheostat may constantly be cooled by the passage of positively impelled air currents therepast, and the interior of the car may constantly receive positively impelled fresh air currents, the fresh air supplied to the car may be that warmed by the rheostat or not as desired.

Further the embodiment of my invention herein shown contemplates an arrangement for withdrawing foul air from each compartment of the body of the car and positively impelling such foul air to the exterior of the car, the foul air and fresh air devices being preferably driven in harmony in order that the volumetrical relation of air positively introduced into the car and air positively expelled from the car may be maintained constant under all operating conditions.

Further my invention contemplates the provision of a novel and advantageous arrangement of air ducts and appliances, and the convenient disposition and construction of air handling fans and their motor appliances, as will be more fully set forth.

In the drawings, 20 indicates in general a car structure of the ordinary electric street car type, whereof 21 is the body, 22 and 22' the platforms, covered with the usual roof 23 having a central elevated dome 24.

The heating system within the car is preferably divided into two sections, appliances for each section being preferably located adjacent one side of the car, and being in general duplicates of each other. Each section of the system preferably comprises two fresh air inlet ducts, one leading from a chamber containing the electrical resistance devices heated in the ordinary operation of the car, such as the rheostat controlling the car motor, and generally indicated at 25, while the other inlet opens to the atmospheric air without the car for the introduction of unheated air. Each section of the system provides an air propelling device in which either inlet may alternately be connected, each air propelling device having connected therewith an air distributing duct having suitable vent openings to the several car compartments. Each section has also a foul air duct suitably connecting with the several compartments of the car and a foul air propelling device, constantly connected with an outlet duct leading to the exterior of the car. An arrangement is preferably made whereby the inlet duct, communicating with the constant source of heat supply, such as the rheostat, may be thrown into communication with the foul air propelling device or exhauster, whenever it is desired not to pass the heat from the constant source of heat supply to the interior of the car.

The devices for each section of the system being duplicate, I will describe only that on the left hand side of the car (on the top of Fig. 3), it being understood that similar devices and appliances are provided at the other side of the car, like parts of the right hand equipment being distinguished by the exponent "prime" ('), and the parts of the two systems being symmetrically arranged with respect to the diagonally opposite corners of the car.

Specifically indicated, 26 shows a casing surrounding the constant source of heat supply or a rheostat 25, said casing having therein inlet openings 27, preferably at the bottom, and communicating with the two ducts 28 and 28' which respectively lead to the branches of the systems on opposite sides of the car.

In each branch of the system I provide, preferably under a longitudinal seat near the body end or bulkhead, an electric motor 30, a fresh air fan 31, and a foul air fan 32, mounted on opposite ends of the motor shaft, and fresh and foul air intakes or vacuum chambers 33 and 34 communicating respectively with the inlet side of the fans 31 and 32. The pipe 28 for conveying fresh air warmed by the rheostat 25 (which I will for distinction call "warm fresh air") has communication through the T 35 and an extension elbow 36 respectively with the fresh and foul air fan intakes 33 and 34. Dampers 37 and 38 are provided for said communications 35 and 36 so that by suitably moving the dampers, which may, if desired, be detachably connected together, as by a threaded link 39, for operation in harmony, the pipe 28 may be closed from communication with either fan and open to communication with the other alternatively. The second fresh air inlet, 40, for air at atmospheric temperature (or "cold fresh air" as I shall term it) may conveniently be located on the side of the car body adjacent its end, and a cold air duct 41 led down therefrom and under the car floor up to the fresh air intake chamber 33, such inlet pipe being provided with a suitable damper 42 which may, if desired, be detachably connected for simultaneous operation with the damper 38 so that the fresh air pipe 41 is closed whenever the pipe 28 is open to the fresh air fan. The outlet of the fresh air fan has connection through a duct 43 with an auxiliary heating chamber 44, which may be provided with any suitable electric heater 45 having its circuit controlled from a suitable point on the car, such as the conductor's station, by any suitable electrical switch 46ª, so that the heater 45 (which is typical of any suitably constructed auxiliary heater) may be thrown into or out of operation as required.

From the secondary-heater casing 44 a distributing duct 46 runs throughout the car within its body and out to the end platforms, being at suitable intervals provided with screened vent openings 47, the openings intermediate the ends of the pipe preferably having diagonal deflectors 48 adjacent their edges remote from the fan, in the direction of travel of the air, as best illustrated in Fig. 6.

To the intake chamber 34ª for the exhaust or foul air fan 32 I run two foul air ducts, a larger duct 50 extending from a hood 51 opening to the interior of the dome 24 of the car relatively adjacent its end, and a smaller duct 52 opening from a hood 53 communicating with the adjacent platform of the car at its roof level. Both of the foul air pipes 50 and 52 are carried down with the fresh air pipe 41 in a housing or sheathing 54 in the extreme corner of the car to the floor level, and lead into the intake chamber 34ª of the foul air fan 32. The outlet of the foul air fan communicates through a duct 55 with a screened air outlet 56 to the side of the car below the level of the floor.

The structural features of the installation above described may obviously be widely varied, but I have found in practice that there appears to be considerable virtue from a power saving standpoint in handling the air, if at each point where a body of air is entrained into a pipe from a relatively larger area where the air is comparatively motionless, the pipe be given a large intake capacity and a tapering shape, as shown in hood 51 in Fig. 2, in the outlet from the auxiliary heating chamber 44 in Fig. 5, etc., although this obviously is a refinement of the invention, not essential to its application. Further I have found it very convenient to provide a special form of casing for the motor and fans, as indicated in Figs. 12 and 13, to this end providing upon a single base 60 a structure comprising the peripheral shells 33$^a$ and 34$^a$ of the intake chambers for the fresh and foul air fans, and the lower halves 31$^a$ and 32$^a$ of the casings for the fans, as well as the lower half 30$^a$ of the motor casing. The upper half 30$^b$ of the motor casing I provide as a separate member adapted to be secured upon the lower half 30$^a$ independently of the completion of the fan casing. For the application of these parts to complete the assembled casing-structure, I provide in a connected unit the upper halves 31$^b$ and 32$^b$ of the two fan casings, connected together by a cover quadrant or section 61 for the motor, having hinged thereto a movable section 63 or door quadrant to overlie the motor structure. Obviously, for oiling bearings and the like, access may be had to the motor and fans through the door 63, and when it is desired to get full access to the fans and motor, the parts may be separated in the relation shown in Figs. 12 and 13.

In the operation of the system, both sections work alike, both fans of the section being driven from a single motor so that they operate synchronously at all times, although obviously the fans might be independently driven if desired. The fans when in operation will supply either heated or cold air to the body and platforms of the car and simultaneously will expel or exhaust impure air from adjacent the roof of the car and expel it to the exterior. When it is desired to supply tempered air to the car, the dampers 37, 38, and 42 are turned to such relative position that the warm air pipe 28 is opened to the fresh air intake chamber 33 of fan 31 and cut off from the intake chamber 34 of the fan 32, while the cold air pipe 41 is cut off from the fresh air fan intake 33. Now the fresh air, warmed by the rheostat 25, follows the path indicated by dotted tailless arrows, in Fig. 5, passing through the openings 27 in the rheostat casing 26 through the pipe 28 into the fresh air fan intake 33 through the fan and the secondary heating chamber 44 to the distributing pipe 46, while foul air, drawn from the top of the car both in the platform compartments and the body through the pipes 50 and 52, passes, as indicated by the solid and dotted tailed arrows respectively, into the intake chamber 34 for the foul air fan and down through the duct 55 through the foul air outlet to the atmosphere. If it is desired further to heat the air, the auxiliary heater within the chamber 44 is put in operation, but I have found in practice, in street cars operating in the city of Chicago, that a car may be heated sufficiently for all ordinary temperatures in winter with the heat ordinarily wasted by the rheostat controlling the motors upon the car, which rheostat operates, in my system, as a constant source of heat supply, radiating heat which may be dissipated either to the interior of the car or to the exterior atmosphere.

Where, as in summer, it is desired to supply "cold" fresh air, or air at atmospheric temperature, the dampers 37, 38, and 42 are thrown in positions the reverse to those above described, that is to say, so that the warm air pipe 28 is cut off from the fresh air intake 33 of fan 31 and opened to the foul air intake 34 of fan 32, while the cold air pipe 41 is opened to the fresh-air fan intake 33. Under these conditions, the foul air fan draws partly from the foul air pipes 50 and 52, and partly from the pipe 28 conveying warm fresh air, so that the heat generated by the rheostat is passed as indicated by the arrows tailed their full length, in Fig. 5, through the pipe 28 and the foul air fan to the foul air outlet 56 without being permitted to escape at all into the body of the car. At the same time, fresh air from the cold air intake pipe 41 passes, as indicated by the solid tailed arrows, into the fresh air fan and is delivered into the distributing pipe 46. Under such conditions, the volume of foul air exhausted through the pipes 50 and 52 is of course somewhat reduced, as the foul air fan is handling air from the fresh air pipe 28. This, however, is in practice no objection for it will be obvious that at these times when the outside air is so warm that no heat need be supplied to the car, the ventilators at the top of the car may be opened (although in practice this is not necessary) and the air introduced in relatively cool condition and at a low level, receiving the heat from the passengers within the car, will escape of its own buoyancy, aided by the constant introduction of fresh bodies of cool air beneath it. In the winter, however, when it is desired to have the upper ventilators closed to prevent downward drafts upon the heads of the passengers, the foul air fans, handling nothing but foul air, are abundantly adequate to remove foul air from the car as rapidly as fresh air is fed in by the fresh air fans.

While, as I have hereinbefore described, the dampers 37, 38, and 42 are to be connected for normal operation so that when the cold air inlet is connected to the fresh air fan, the hot air inlet is cut off therefrom, it will be obvious that by intermediate adjustments of the dampers,—independently after disconnection from each other, or harmoniously while interconnected—the fresh air fan may be made to draw partly from the cold air pipe and partly from the hot air pipe to secure a nicely regulable degree of attemperation of the air to suit the weather conditions.

While I have herein described in some detail a particular embodiment of my invention, it will be apparent to those skilled in the art that numerous changes in the details of construction might be made without departure from the spirit of my invention and within the scope of the appended claims.

What I claim is:

1. The combination with a car, provided with means for constantly radiating heat, when the car is in service, of a fan for delivering air into the car, and means establishing air paths from said constant source of heat to said fan and to the exterior of the car, and means establishing a passage for unheated air from the exterior of the car to said fan.

2. The combination with a car, of a fresh air fan, a distributing pipe connected therewith, a foul air fan, means establishing communication between said foul air fan and the exterior of the car, a source of heat supply, and means establishing regulable passages between said source of heat supply and both the fresh and the foul air fan, whereby the heat from said source of supply may be introduced into the car through the fresh air fan or pass to the exterior of the car through the foul air fan.

3. The combination with a car, of fan driving means, a fresh air fan, a foul air fan, a source of heat supply, a hot air pipe leading from said source of heat supply in communication with both the fresh air fan and the foul air fan, a cold air duct leading from the exterior of the car to the fresh air fan, and means for regulating said fresh air fan and cold air connections with the hot air and cold air connections with the fresh air fan, a distributing system communicating with the fresh air fan outlet, and an outlet connection for the foul air fan leading to the exterior of the car.

4. The combination with a car provided with means incident to the operation of the car for constantly radiating heat when the car is in use, of a fan for delivering air into the car, means establishing air paths from such constant source of heat to said fan and to the exterior of the car, means establishing an air path for unheated air from the exterior of the car to said fan, and means controlling said several air paths.

5. The combination with a car, of a fan driving means, of a fresh air fan, a foul air fan, a source of heat supply, means establishing two fresh air supply paths through the fresh air fan, one including the source of heat and the other excluding it, and means for establishing two air paths through the foul air fan, one including said source of heat and the other excluding it.

6. The combination with an electric car divided into separable compartments, of means for introducing air into said compartments near the floor level thereof, exhaust hoods opening to said compartments near the roof thereof, each said exhaust hood providing an enlarged opening to the compartment and a tapering connection to an air duct, air ducts for said hoods, an exhaust fan with which said ducts communicate, having an opening into the atmosphere, and means for driving said fan.

7. In a car heating system, a motor, a fresh air fan and a foul air fan driven by said motor and located on opposite sides of said motor, and a housing structure for the fans and motor comprising as a unit a section of the motor casing and sections of the fan casing, and as another unit separable from the first the balance of the fan casings and a cover part for the motor provided with an opening door.

8. In a car heating system, a motor, two fans connected with said motor on opposite sides thereof, and an intake chamber for said fans in alinement therewith, said structure comprising in unitary or permanently assembled relation a section of the motor casing, sections of a fan casing, and the peripheral walls of the intake chambers, and as a separable unit assembled parts comprising the balance of the fan casings and a cover for the motor embodying a movable door.

9. The combination with a car of a fresh air fan having a distributing pipe leading into the interior of the car, an intake chamber at the inlet side of the fan, a foul air fan having an outlet connection with the exterior of the car, an intake chamber for said foul air fan, at the inlet side thereof, a plurality of fresh air piping connections communicating with the intake chamber of the fresh air fan, and a plurality of air connections communicating with the intake of the foul air fan, and affording a foul air passage from the interior of the car.

10. In a car ventilating system, the combination with a car, of a fan for effecting positive circulation of air with respect to the car, a plurality of air pipes for communication with the inlet of the fan, and a fan intake chamber exterior to the fan, in open communication to the fan, and arranged to receive in communication therewith a plurality of air pipes aforesaid.

11. The combination, in a ventilating system, of a fan provided with a surrounding casing, and an auxiliary casing inclosing an air chamber of substantially equal diameter with the fan casing and connected thereto, to which latter casing pipes of the system may be connected.

12. The combination in a ventilating system, of an electric motor, a fan connected to each end of the shaft of said motor, fan casings inclosing said fans, and auxiliary casings of substantially equal diameter with the fan casings, connected to the respective fan casings.

In testimony whereof I hereunto set my hand in the presence of two witnesses.

MIN DE LIN McGERRY.

In the presence of—
 FORÉE BAIN,
 MARY F. ALLEN.